United States Patent
Kondo et al.

(10) Patent No.: US 11,926,261 B2
(45) Date of Patent: Mar. 12, 2024

(54) VISUAL RECOGNITION DEVICE FOR VEHICLE

(71) Applicant: KABUSHIKI KAISHA TOKAI-RIKA-DENKI-SEISAKUSHO, Aichi (JP)

(72) Inventors: Masahiro Kondo, Aichi (JP); Shigeki Yoshida, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 344 days.

(21) Appl. No.: 17/281,770

(22) PCT Filed: Sep. 18, 2019

(86) PCT No.: PCT/JP2019/036563
§ 371 (c)(1),
(2) Date: Mar. 31, 2021

(87) PCT Pub. No.: WO2020/071122
PCT Pub. Date: Apr. 9, 2020

(65) Prior Publication Data
US 2021/0380040 A1 Dec. 9, 2021

(30) Foreign Application Priority Data
Oct. 5, 2018 (JP) .................. 2018-190023

(51) Int. Cl.
*B60R 1/07* (2006.01)
(52) U.S. Cl.
CPC ...................... *B60R 1/07* (2013.01)

(58) Field of Classification Search
CPC B60R 1/07; B60R 1/074; B60R 1/076; B60R 1/06; B60R 1/072
USPC ......................................... 359/872
See application file for complete search history.

(56) References Cited

FOREIGN PATENT DOCUMENTS

| JP | A 2006-021666 | 1/2006 |
|---|---|---|
| JP | A 2015-104961 | 6/2015 |

OTHER PUBLICATIONS

Examiner provided machine translation of Masahiro et al., JP 2015104961 (Year: 2015).*
Examiner provided machine translation of Ishigami et al., JP 2006021666 (Year: 2006).*

* cited by examiner

*Primary Examiner* — Balram T Parbadia
*Assistant Examiner* — Rahman Abdur
(74) *Attorney, Agent, or Firm* — Dority & Manning, PA

(57) ABSTRACT

In a door mirror device for a vehicle, when a driving body is moved rotationally towards an upper side, a gear plate is moved towards a lower side so that urging force applied from a coil spring to the driving body is decreased. In contrast, when the driving body is moved rotationally towards the lower side, the gear plate is moved towards the upper side so that the urging force applied from the coil spring to the driving body is increased. As a result, it is possible to reduce a difference between a load that is applied in order to move the driving body rotationally towards the upper side and the load that is applied in order to move the driving body rotationally towards the lower side.

3 Claims, 6 Drawing Sheets

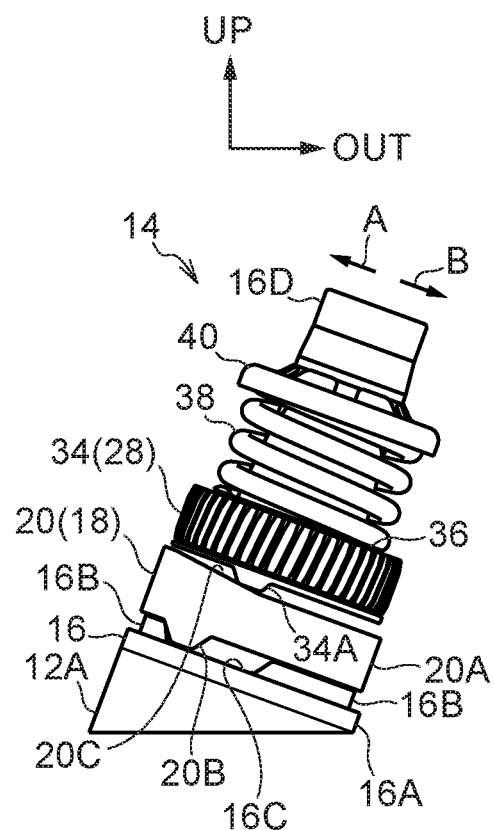

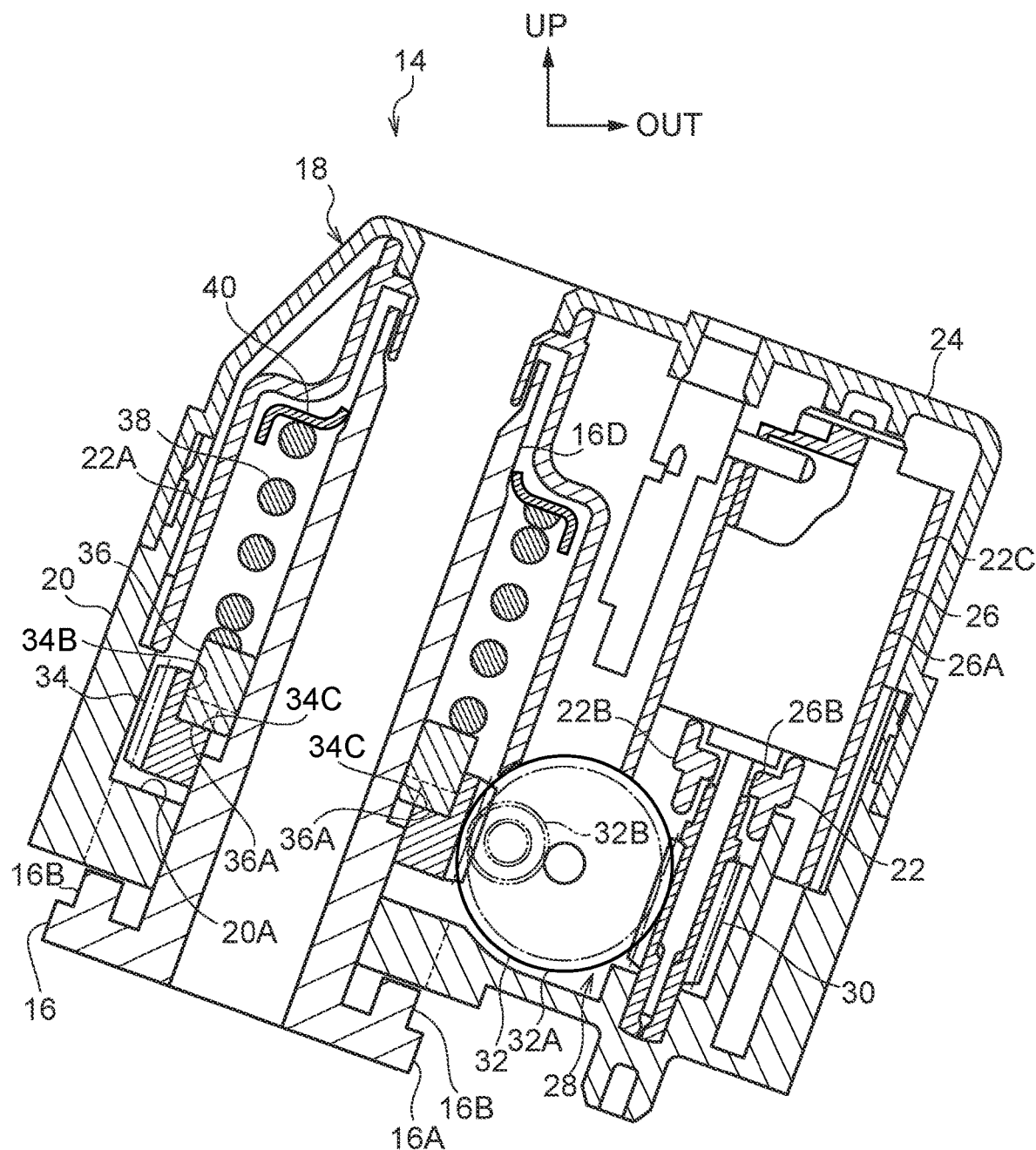

VISUAL RECOGNITION DEVICE FOR VEHICLE

CROSS-REFERENCE TO RELATED APPLICATIONS

The present application is related and has right of priority to JP 2018-190023, which was filed on Oct. 5, 2018 in the Japanese Patent Office, and is a U.S. national phase entry of PCT/JP2019/036563, which was filed on Sep. 18, 2019, both of which are incorporated by reference in their entireties for all purposes.

TECHNICAL FIELD

The present disclosure relates to a visual recognition device for a vehicle in which a visual recognition portion provides visual recognition assistance to a vehicle occupant.

BACKGROUND ART

In a door mirror described in Japanese Patent Application Laid-Open (JP-A) No. 2006-21666, a base component and a mirror main body are supported on a shaft so as to be able to move rotationally, and a central axis of the rotational movement of the base component and the mirror main body is tilted relative to an up-down direction.

Furthermore, as a result of a motor being driven, the base component and the mirror main body are moved rotationally towards the upper side and the lower side.

Here, in the door mirror, a load that is applied in order to rotationally move the base component and the mirror main body towards the upper side is greater than a load that is applied in order to rotationally move the base component and the mirror main body towards the lower side.

SUMMARY OF THE INVENTION

Technical Problem

The present disclosure was conceived in view of the above-described circumstances and it is an object thereof to provide a visual recognition device for a vehicle in which a difference between a load that is applied in order to rotationally move a rotationally moving body towards an upper side and a load that is applied in order to rotationally move a rotationally moving body towards the lower side is reduced.

Solution to the Problem

A visual recognition device for a vehicle of a first aspect of the present disclosure is provided with a supporting body that is provided on a vehicle body side, a rotationally moving body that is supported on the supporting body to as to be able to move rotationally, and whose central axis of rotational movement is tilted relative to an up-down direction, and in which is provided a visual recognition portion that provides visual recognition assistance to a vehicle occupant, a rotational movement mechanism that rotationally moves the rotationally moving body, and an urging body that urges the rotationally moving body, and whose urging force that is applied to the rotationally moving body is decreased when the rotational movement mechanism is rotationally moving the rotationally moving body towards an upper side, and whose urging force that is applied to the rotationally moving body is increased when the rotational movement mechanism is rotationally moving the rotationally moving body towards a lower side.

A visual recognition device for a vehicle of a second aspect of the present disclosure is characterized in that, in the visual recognition device for a vehicle of the first aspect of the present disclosure, when the rotational movement mechanism is rotationally moving the rotationally moving body towards an upper side, the rotationally moving body decreases the urging force applied by the urging body to the rotationally moving body, and when the rotational movement mechanism is rotationally moving the rotationally moving body towards a lower side, the rotationally moving body increases the urging force applied by the urging body to the rotationally moving body.

A visual recognition device for a vehicle of a third aspect of the present disclosure is characterized in that, in the visual recognition device for a vehicle of the second aspect of the present disclosure, when the rotational movement mechanism is rotationally moving the rotationally moving body towards an upper side, the supporting body decreases the urging force applied by the urging body to the rotationally moving body, and when the rotational movement mechanism is rotationally moving the rotationally moving body towards a lower side, the supporting body increases the urging force applied by the urging body to the rotationally moving body.

Advantageous Effects of the Invention

In the visual recognition device for a vehicle of the first aspect of the present disclosure, a supporting body is provided on the vehicle body aide, and a rotationally moving body is supported on the supporting body so as to be able to move rotationally. In addition, a visual recognition portion is provided on the rotationally moving body, and this visual recognition portion provides visual recognition assistance to a vehicle occupant. Moreover, a central axis of rotational movement of the rotationally moving body is tilted relative to an up-down direction, and an urging boy urges the rotationally moving body.

Here, when the rotational movement mechanism is rotationally moving the rotationally moving body towards the upper side, the urging force applied from the urging body to the rotationally moving body is decreased, and when the rotational movement mechanism is rotationally moving the rotationally moving body towards the lower side, the urging force applied from the urging body to the rotationally moving body is increased. Because of this, it is possible to reduce a difference between a load that is applied in order to rotationally move the rotationally moving body towards the upper side and a load that is applied in order to rotationally move the rotationally moving body towards the lower side.

In the visual recognition device for a vehicle of the second aspect of the present disclosure, when the rotational movement mechanism is rotationally moving the rotationally moving body towards an upper side, the rotationally moving body decreases the urging force applied by the urging body to the rotationally moving body, and when the rotational movement mechanism is rotationally moving the rotationally moving body towards a lower side, the rotationally moving body increases the urging force applied by the urging body to the rotationally moving body. As a result, the urging force applied from the urging body to the rotationally moving body can be increased or decreased by the rotationally moving body.

In the visual recognition device for a vehicle of the third aspect of the present disclosure, when the rotational movement mechanism is rotationally moving the rotationally moving body towards an upper side, the supporting body decreases the urging force applied by the urging body to the rotationally moving body, and when the rotational movement mechanism is rotationally moving the rotationally moving body towards a lower side, the supporting body increases the urging force applied by the urging body to the rotationally moving body. As a result, the urging force applied from the urging body to the rotationally moving body can be increased or decreased by the supporting body.

BRIEF DESCRIPTION OF THE DRAWINGS

FIG. 1C is a front view as seen from a vehicle rear side showing the door mirror device for a vehicle according to an exemplary embodiment of the present disclosure, and shows a state in which this mirror is folded in.

FIG. 2C is a front view as seen from a vehicle rear side showing principal portions of the door mirror device for a vehicle according to an exemplary embodiment of the present disclosure, and shows a state in which this mirror is folded in.

FIG. 3 is a cross-sectional view as seen from a vehicle rear side showing a folding-in mechanism of the door mirror device for a vehicle according to an exemplary embodiment of the present disclosure.

DESCRIPTION OF THE EMBODIMENTS

Figure 1A:
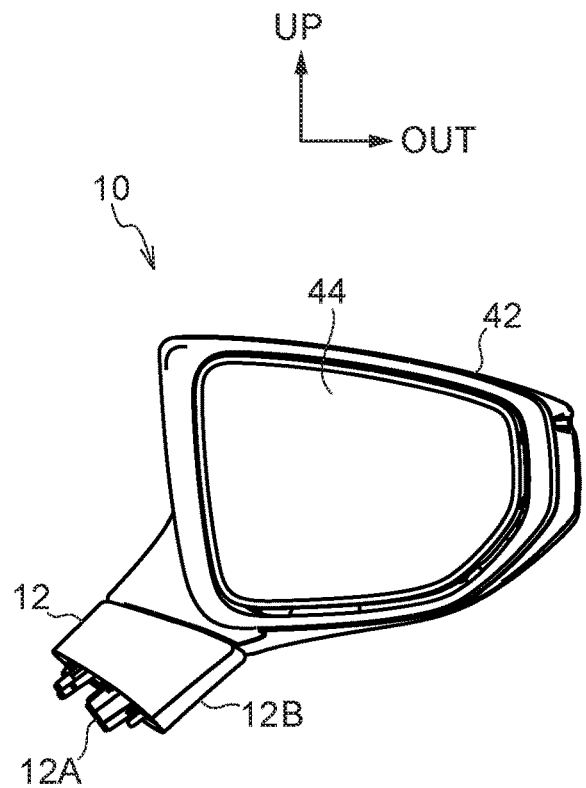
FIG. 1A is a front view as seen from a vehicle rear side showing a door mirror device for a vehicle according to an exemplary embodiment of the present disclosure, and shows a state in which this mirror is folded out.

A door mirror device 10 for a vehicle which serves as a visual recognition device for a vehicle according to an exemplary embodiment of the present disclosure is shown in a front view as seen from a vehicle rear side in FIG. 1A. Note that, in these drawings, an arrow FR, an arrow OUT, and an arrow UP that are shown in the appropriate drawings respectively indicate a vehicle forward direction, an outward side (i.e., a vehicle right side) in a width direction of the vehicle, and an upward direction.

The door mirror device 10 for a vehicle according to the present exemplary embodiment is mounted on a central portion in an up-down direction and at a vehicle front-side end of a side door (of a front side-door, in particular) which serves as a vehicle door, and is mounted on the vehicle outward side.

As is shown in FIG. 1A, a base 12 which serves as a mounting body, is provided in the door mirror device 10 for a vehicle. A block-shaped base main body 12A which serves as a main body portion is provided in the base 12. The door mirror device 10 for a vehicle is mounted on the side door as a result of the base main body 12A being fixed to the side door (i.e., to the vehicle body side). The base main body 12A is covered by base cover 12B which is formed in the shape of a circular cylinder having one closed end. The interior of the base cover 12B is open on a lower side thereof, and an upper wall (i.e., a bottom wall) thereof exposes the base main body 12A on the upper side thereof.

Figure 2A:
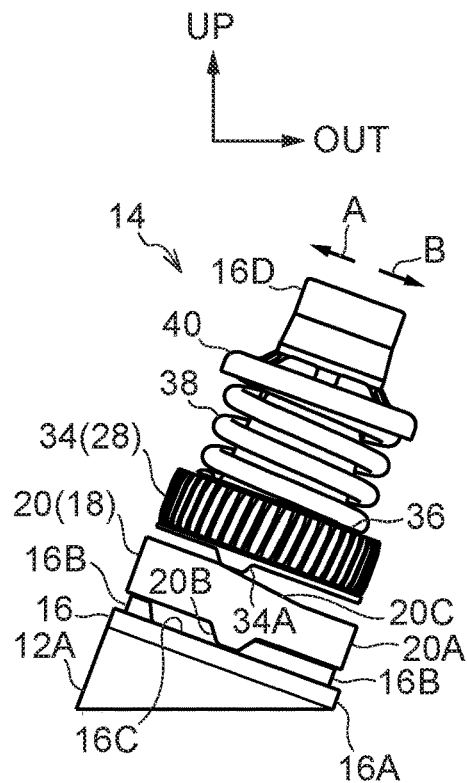
FIG. 2A is a front view as seen from a vehicle rear side showing principal portions of the door mirror device for a vehicle according to an exemplary embodiment of the present disclosure, and shows a state in which this mirror is folded out.
Figure 4:
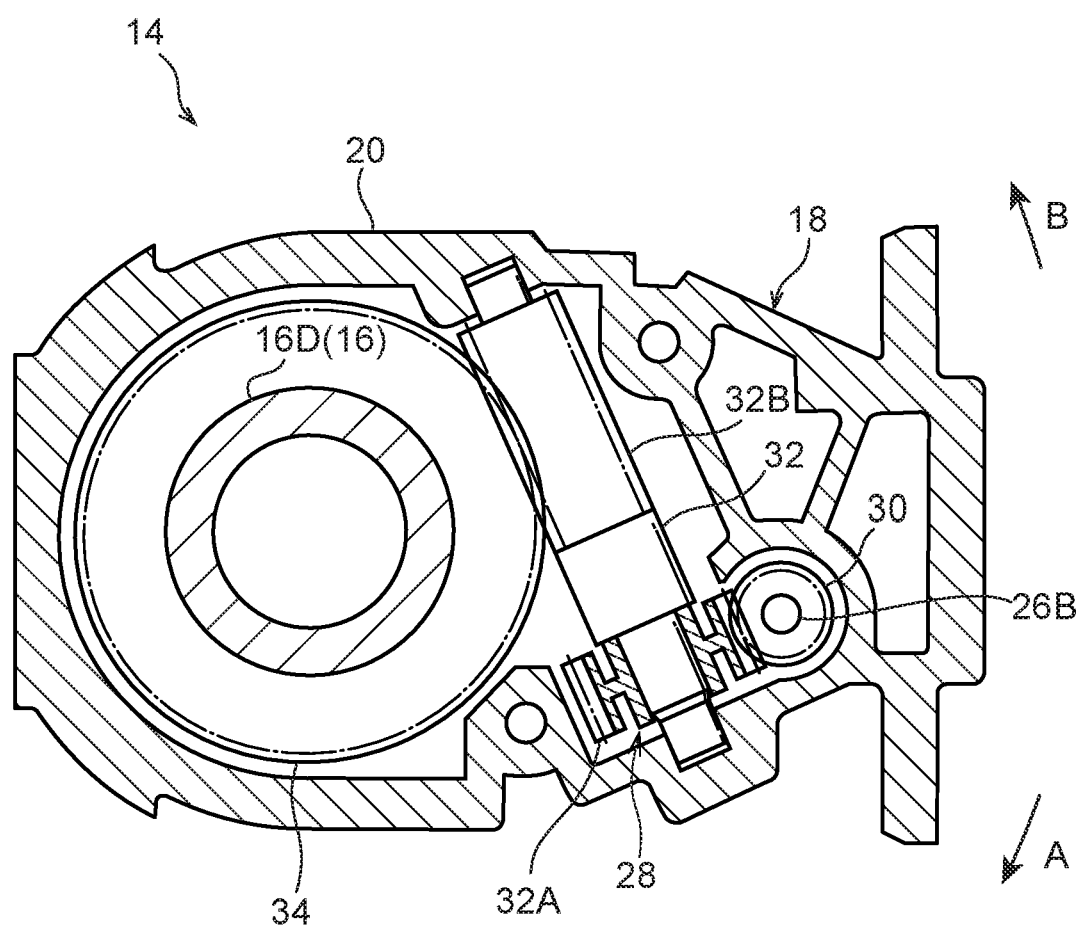
FIG. 4 is a cross-sectional view as seen from a vehicle upper side showing a folding-in mechanism of the door mirror device for a vehicle according to an exemplary embodiment of the present disclosure.

A folding-in device 14 (see FIG. 2A, FIG. 3, and FIG. 4) which serves as a rotational movement device is supported on an upper side of the base 12.

A stand 16 which serves as a supporting body is provided in the folding-in device 14. A substantially circular-plate shaped fixing portion 16A is provided at a lower end of the stand 16. As a result of this fixing portion 16A being fixed to the upper side of the base main body 12A of the base 12, the stand 16 is fixed to the base 12, and the folding-in device 14 is supported on the base 12. In addition, an axial direction of the fixing portion 16A is tilted so as to be progressively further to the outer side in the vehicle width direction the closer it is to the vehicle upper side.

A plurality (two in the present exemplary embodiment) of curved pillar-shaped restricting frames 16B which serve as restricting portions are provided integrally with an upper surface of the fixing portion 16A. The plurality of restricting frames 16B each extend in a circumferential direction of the fixing portion 16A, and are spaced equidistantly from each other in the circumferential direction of the fixing portion 16A. The upper surface of the fixing portion 16A between the restricting frames 16B is formed as a first engaging surface 16C which serves as a first engaged portion, and the first engaging surface 16C extends in the circumferential direction of the fixing portion 16A.

A substantially circular-cylinder shaped supporting shaft 16D which serves as a supporting portion is provided on an inward side of the restricting frames 16B and the first engaging surface 16C integrally with the upper side of the fixing portion 16A. The supporting shaft 16D extends onto the upper side of the base 12. The supporting shaft 16D is disposed so as to be coaxial with the fixing portion 16A, and the axial direction of the supporting shaft 16D is tilted so as to be progressively further to the outer side in the vehicle width direction the closer it is to the vehicle upper side.

A drive body 18 that forms part of a rotationally moving body is supported so as to be able to move rotationally on the supporting shaft 16D. The drive body 18 is able to move rotationally around the supporting shaft 16D in a folding-in direction (i.e., a direction indicated by an arrow A in FIG. 4 and the like) and a standing-out direction (i.e., a restoral direction, a direction indicated by an arrow B in FIG. 4 and the like).

A container-shaped case 20 which serves as a rotationally moving component is provided at a lower-side portion of the drive body 18, and the interior of the case 20 is open on an upper side thereof. A substantially circular-cylinder shaped engaging cylinder 20A which serves as an engaging portion is formed on an inner side portion in the vehicle width direction of a lower wall of the case 20. As a result of the supporting shaft 16D of the stand 16 being inserted into the interior of the engaging cylinder 20A and being engaged therewith, the case 20 is supported by the supporting shaft 16D so as to be able to move rotationally, and the drive body 18 is also supported by the supporting shaft 16D so as to be able to move rotationally.

A plurality (two in the present exemplary embodiment) of first engaging projections 20B which serve as first engaging portions are provided integrally with a lower surface of the engaging cylinder 20A. The plurality of first engaging projections 20B each protrude downwards, and are spaced equidistantly from each other in the circumferential direction of the engaging cylinder 20A. The first engaging projections 20B abut against the first engaging surface 16C of the stand 16 (i.e., of the fixing portion 16A) so that, as a result of this, the engaging cylinder 20A is supported from the lower side thereof by the fixing portion 16A, and the case 20 is also supported from the lower side thereof by the fixing portion 16A. The first engaging projections 20B abut against ends on the folding-in direction side of the restricting frames 16B of the stand 16 (i.e., of the fixing portion 16A) so that, as a result of this, rotational movement in the folding-in direction of the engaging cylinder 20A is restricted, and rotational movement in the folding-in direction of the case 20 is also restricted.

A plurality (two in the present exemplary embodiment) of second engaging surfaces 20C which serve as second engaged portions (i.e., moving portions) are formed on an upper surface of the engaging cylinder 20A. The plurality of second engaging surfaces 20C are progressively inclined in a downward direction approaching the projection direction, and are spaced equidistantly from each other in the circumferential direction of the engaging cylinder 20A.

A motor base 22 which serves as an assembling component is fixed to an interior of an upper portion of the case 20. A substantially circular-cylinder shaped housing cylinder 22A is provided in an inner-side portion in the vehicle width direction of the motor base 22, and the supporting shaft 16D of the stand 16 is housed inside this housing cylinder 22A so as to be coaxial therewith. A substantially rectangular-plate shaped bottom wall 22B is provided at an outer-side portion in the vehicle width direction of the motor base 22, and the bottom wall 22B is formed integrally with a lower end portion of the housing cylinder 22A. A substantially elliptical-cylinder shaped assembling cylinder 22C is provided integrally with an upper surface of the bottom wall 22B, and the assembling cylinder 22C protrudes onto the upper side from the bottom wall 22B.

A container-shaped cover 24 which serves as a covering component is provided on the upper side of the case 20 and the motor base 22, and an interior of this cover 24 is open on the lower side thereof. A lower end of the cover 24 is fixed to an outer circumference of an upper end portion of the case 20, and the cover 24 covers the upper sides of the case 20 and the motor base 22.

A motor 26 which serves as a drive device forming part of a rotational movement mechanism is provided within the folding-in device 14. A substantially elliptical-column shaped motor main body 26A is provided in the motor 26, and the motor main body 26A is assembled in the interior of the assembling cylinder 22C of the motor base 22 from the upper side thereof, and is fixed in this position. An output shaft 26B extends onto the lower side of the motor main body 26A, and the output shaft 26B is inserted through the bottom wall 22B of the motor base 22 so as to extend onto the lower side of the motor base 22.

A gear mechanism 28 that forms part of a rotational movement mechanism is provided inside the case 20.

A worm gear 30 which is made from resin and serves as a first stage gear is provided in the gear mechanism 28 on a lower side of the motor 26. A lower portion of the worm gear 30 is supported on a lower wall of the case 20 so as to be able to rotate freely. The output shaft 26B of the motor 26 is inserted from above into the worm gear 30 so as to be coaxial therewith. As a result of the motor 26 being driven and thereby causing the output shaft 26B to rotate, the worm gear 30 is rotated integrally with the output shaft 26B.

A worm shaft 32 which serves as an intermediate gear is provided in the gear mechanism 28 on the inner side in the vehicle width direction of the worm gear 30. One end (i.e., a vehicle rear-side end) and another end (i.e., a vehicle front-side end) of the worm shaft 32 are supported on a peripheral wall of the case 20 so as to be able to rotate freely. A helical gear portion 32A is provided on the one end-side portion of the worm shaft 32 so as to be coaxial therewith, and a worm gear portion 32B which serves as a worm is provided on the other end-side portion of the worm shaft 32 so as to be coaxial therewith. The helical gear portion 32A meshes with the worm gear 30, and as a result of the worm gear 30 being rotated, the helical gear portion 32A and the worm gear portion 32B are rotated integrally with each other so that the worm shaft 32 is rotated.

A gear plate 34 (i.e., a worm wheel) serving as a final gear (i.e., an engaging component) is provided in the gear mechanism 28 on the inner side in the vehicle width direction of the worm shaft 32. The supporting shaft 16D of the stand 16 is inserted through the gear plate 34 so as to be coaxial therewith and, as a result, the gear plate 34 is supported on the supporting shaft 16D so as to be able to rotate freely.

A plurality (two in the present exemplary embodiment) of second engaging projections 34A which serve as second engaging portions are provided integrally with a lower surface of the gear plate 34. The plurality of second engaging projections 34A each protrude downwards, and are spaced equidistantly from each other in the circumferential direction of the gear plate 34. The second engaging projections 34A abut against an end portion on the folding-in direction side of the second engaging surfaces 20C of the case 20 (i.e., the engaging cylinder 20A) so that, as a result of this, the gear plate 34 is supported from the lower side thereof by the engaging cylinder 20A.

A circular-column shaped fitting recessed portion 34B is formed in an upper surface of the gear plate 34 so as to be coaxial therewith, and this fitting recessed portion 34B is open on an upper side thereof. A plurality (four in the present exemplary embodiment) of recessed portions 34C are formed in a lower surface of the fitting recessed portion 34B. The plurality of recessed portions 34C are each open on an upper side thereof, and are spaced equidistantly from each other in the circumferential direction of the gear plate 34.

A substantially circular-cylinder shaped clutch plate 36 which serves as a restricting component is provided on an upper side of the gear plate 34. The supporting shaft 16D of the stand 16 is inserted through the clutch plate 36 so as to be coaxial therewith, and the clutch plate 36 is supported on the supporting shaft 16D so as to be unable to rotate. The clutch plate 36 is able to move in the axial direction of the supporting shaft 16D, and the clutch plate 36 is fitted inside the fitting recessed portion 34B of the gear plate 34.

A plurality (four in the present exemplary embodiment) of protruding portions 36A are formed on a lower surface of the clutch plate 36. The plurality of protruding portions 36A each protrude downwards, and are spaced equidistantly from each other in the circumferential direction of the clutch plate 36. The protruding portions 36A are inserted into the recessed portions 34C in the gear plate 34, so that the protruding portions 36A are made to fit together with the recessed portions 34C in the circumferential direction of the gear plate 34.

A helical-rod shaped coil spring 38 which serves as an urging body and is made out of metal is provided on an upper side of the clutch plate 36, and the supporting shaft 16D of the stand 16 is inserted through the interior of the coil spring 38 so as to be coaxial therewith.

A substantially annular-plate shaped push nut 40 which serves as an anchoring component is provided on an upper side of the coil spring 38, and the push nut 40 is fixed to the supporting shaft 16D of the stand 16 so as to be coaxial therewith. The push nut 40 pushes the coil spring 38 downwards so as to compress it, and this causes the coil spring 38 to urge the clutch plate 36, the gear plate 34, and the engaging cylinder 20A of the case 20 downwards. As a result of this urging force, the coil spring 38 maintains a state in which the protruding portions 36A of the clutch plate 36 are inserted inside the recessed portions 34C in the gear plate 34 so that, as a result of this, the rotation of the gear plate 34 is restricted by the clutch plate 36.

The worm gear portion 32B of the worm shaft 32 meshes with the gear plate 34 so that, as a result of this, rotational movement of the worm gear portion 32B around the gear plate 34 is stopped, and rotational movement of the drive body 18 relative to the gear plate 34 is also stopped. As is described above, during the rotation of the worm gear portion 32B, as a result of the worm gear portion 32B being moved rotationally around the gear plate 34, the drive body 18 is moved rotationally around the supporting shaft 16D of the stand 16 integrally with the worm gear portion 32B.

The drive body 18 is housed within an end portion on the inner side in the vehicle width direction of a visor 42 (see FIG. 1A) which is formed as a substantially rectangular-parallelepiped shaped container and serves as a housing body which forms part of the rotating body, and an interior of the visor 42 is open to the vehicle rear side. A substantially rectangular-plate shaped mirror 44 (see FIG. 1A) which serves as a visual recognition portion which forms part of the rotating body is disposed in the vicinity of this open portion, and the visor covers an entire circumference and vehicle front-side surface of the mirror 44.

The visor 42 and the mirror 44 are linked to, and supported by the drive body 18. The visor 42 and the mirror 44 protrude, together with the drive body 18, onto the outer side in the vehicle width direction so as to stand out (i.e., be folded out) from the side door. A mirror surface of the mirror 44 faces towards the vehicle rear side so that, as a result, the mirror 44 enables a vehicle occupant (particularly the driver) to visually recognize an area to the vehicle rearward side, and consequently, provides visual recognition assistance to the vehicle occupant. In addition, the visor 42 and the mirror 44 are able to move rotationally together with the drive body 18 around the supporting shaft 16D of the stand 16.

Next, actions of the present exemplary embodiment will be described.

In the door mirror device 10 for a vehicle having the above-described structure, in the folding-in device 14, the coil spring 38 urges the clutch plate 36, the gear plate 34, and the engaging cylinder 20A of the case 20 downwards. Because of this, the protruding portions 36A of the clutch plate 36 are held in a state of insertion in the recessed portions 34C in the gear plate 34, so that rotation of the gear plate 34 relative to the clutch plate 36 is restricted. As a result of this, rotation of the drive body 18, the visor 42, and the mirror 44 is also restricted.

In the folding-in device 14, when the motor 26 is driven so that output shaft 26B is made to rotate, in the gear mechanism 28, the worm gear 30 is rotated integrally with the output shaft 26B, and the worm shaft 32 (i.e., the helical gear portion 32A and the worm gear portion 32B) are also rotated. As a result, the worm gear portion 32B is moved rotationally around the gear plate 34, and the drive body 18, the visor 42, and the mirror 44 are moved rotationally integrally with the worm gear portion 32B.

Figure 1B:
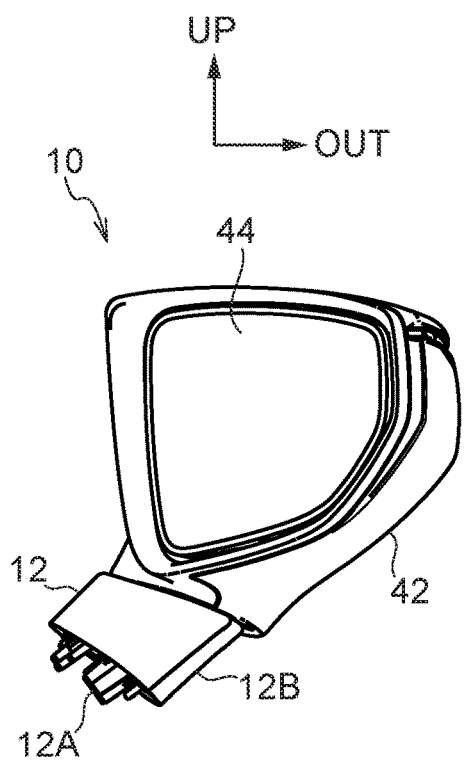
FIG. 1B is a front view as seen from a vehicle rear side showing the door mirror device for a vehicle according to an exemplary embodiment of the present disclosure, and shows a state in which this mirror is being moved rotationally.
Figure 1C:
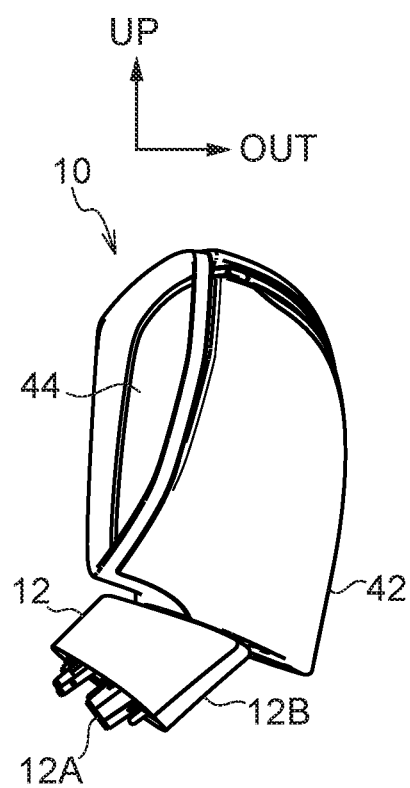
Figure 2B:
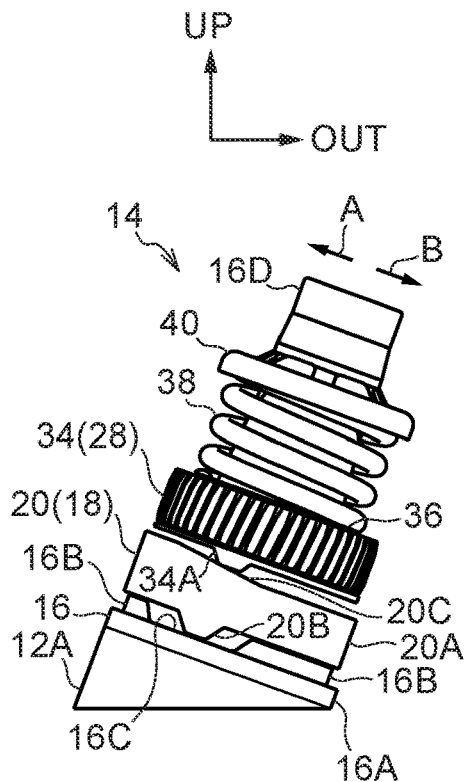
FIG. 2B is a front view as seen from a vehicle rear side showing principal portions of the door mirror device for a vehicle according to an exemplary embodiment of the present disclosure, and shows a state in which this mirror is being moved rotationally.

When the motor 26 is driven so that the output shaft 26B is rotated in one direction, the worm gear portion 32B is moved rotationally in the folding-in direction around the gear plate 34. As a result, the drive body 18, the visor 42, and the mirror 44 are moved rotationally in the folding-in direction (i.e., towards the vehicle rear side, the upper side, and the inner side in the vehicle width direction), and are folded in (FIG. 1A~FIG. 1C). Moreover, when the drive body 18, the visor 42, and the mirror 44 are moved rotationally in the folding-in direction, the first engaging projections 20B of the drive body 18 (i.e., the engaging cylinder 20A) slide across the first engaging surface 16C of the stand 16 (i.e., the fixing portion 16A) (see FIG. 2B). Furthermore, when the drive body 18, the visor 42, and the mirror 44 have been folded in, the first engaging projections 20B abut against ends on the standing-out direction side of the restricting frames 16B of the stand 16 (i.e., the fixing portion 16A), so that the rotational movement of the drive body 18, the visor 42, and the mirror 44 in the folding-in direction is stopped (see FIG. 2C).

In contrast, when the motor 26 is driven so that the output shaft 26B is rotated in the other direction, the worm gear 32B is moved rotationally in the standing-out direction around the gear plate 34. As a result, the drive body 18, the visor 42, and the mirror 44 are moved rotationally in the standing-out direction (i.e., towards the vehicle front side, the lower side, and the outer side in the vehicle width direction), and stand out (i.e., are restored) (FIG. 1A FIG. 1C). Moreover, when the drive body 18, the visor 42, and the mirror 44 are moved rotationally in the standing-out direction, the first engaging projections 20B of the drive body 18 slide across the first engaging surface 16C of the stand 16 (see FIG. 2B). Furthermore, when the drive body 18, the visor 42, and the mirror 44 are standing out, the first engaging projections 20B abut against ends on the folding-in direction side of the restricting frames 16B of the stand 16, so that the rotational movement of the drive body 18, the visor 42, and the mirror 44 in the standing-out direction is stopped (see FIG. 2A).

Here, when the drive body 18, the visor 42, and the mirror 44 are being moved rotationally in the folding-in direction (i.e., the upper side), the second engaging surfaces 20C of the drive body 18 (i.e., the engaging cylinder 20A) slide across the second engaging projections 34A of the gear plate 34, and the gear plate 34 and the clutch plate 36 are moved downwards by the second engaging surfaces 20C. As a result, the coil spring 38 is extended and the urging force applied by the coil spring 38 to the drive body 18 is decreased (see FIG. 2A FIG. 2C).

In contrast, when the drive body 18, the visor 42, and the mirror 44 are moved rotationally in the standing-out direction (i.e., downwards), the second engaging surfaces 20C of the drive body 18 (i.e., the engaging cylinder 20A) slide across the second engaging projections 34A of the gear plate 34, and the gear plate 34 and the clutch plate 36 are moved upwards by the second engaging surfaces 20C. As a result, the coil spring 38 is compressed, and the urging force applied by the coil spring 38 to the drive body 18 is increased (see FIG. 2A FIG. 2C).

Because of this, the load applied by the motor 26 in order to move the drive body 18, the visor 42, and the mirror 44 in the folding-in direction (i.e., upwards) can be decreased, the load applied by the motor 26 in order to move the drive body 18, the visor 42, and the mirror 44 in the standing-out direction (i.e., downwards) can be increased, and the difference between the load applied by the motor 26 in order to move the drive body 18, the visor 42, and the mirror 44 in the folding-in direction (i.e., upwards) and the load applied by the motor 26 in order to move the drive body 18, the visor 42, and the mirror 44 in the standing-out direction (i.e., downwards) can be reduced. As a result, it is possible to inhibit any changes in the speed of the rotational movement of the drive body 18, the visor 42, and the mirror 44 between moving the drive body 18, the visor 42, and the mirror 44 rotationally in the folding-in direction (i.e., upwards), and moving the drive body 18, the visor 42, and the mirror 44 rotationally in the standing-out direction (i.e., downwards), to inhibit any changes in the current supplied to the motor 26, and to inhibit any changes in the noise generated when the motor 26 is driven.

Moreover, as is described above, when the drive body 18, the visor 42, and the mirror 44 are moved rotationally in the folding-in direction (i.e., upwards), the gear plate 34 and the clutch plate 36 are moved downwards by the second engaging surfaces 20C of the drive body 18, and the urging force from the coil spring 38 that is applied to the drive body 18 is decreased. Furthermore, when the drive body 18, the visor 42, and the mirror 44 are moved rotationally in the standing-out direction (i.e., downwards), the gear plate 34 and the clutch plate 36 are moved upwards by the second engaging surfaces 20C of the drive body 18, and the urging force from the coil spring 38 that is applied to the drive body 18 is increased. Because of this, the urging force applied to the drive body 18 by the coil spring 38 can be increased or decreased by the second engaging surfaces 20C of the drive body 18, so that the structure employed to increase or decrease the urging force applied to the drive body 18 by the coil spring 38 can be simplified.

Furthermore, when the drive body 18, the visor 42, and the mirror 44 are moved rotationally in the folding-in direction or in the standing-out direction, there is no displacement of the drive body 18 in the direction of the axis of rotational movement. Because of this, it is possible to inhibit displacement of the drive body 18, the visor 42, and the mirror 44 in the direction of the axis of rotational movement when the drive body 18, the visor 42, and the mirror 44 are moved rotationally in the folding-in direction or in the standing-out direction.

Note that, in the present exemplary embodiment, the second engaging surfaces 20C are provided on the drive body 18 (i.e., the engaging cylinder 20A), and the second engaging projections 34A are provided on the gear plate 34. However, it is also possible for the second engaging projections 34A to be provided on the drive body 18 (i.e., the engaging cylinder 20A) instead, and for the second engaging surfaces 20C to be provided on the gear plate 34.

Furthermore, in the present exemplary embodiment, the second engaging surfaces 20C of the drive body 18 (i.e., the engaging cylinder 20A) are inclined so as to slope progressively downwards the further they are in the standing-out direction. However, either instead of this, or in conjunction with this, it is also possible for the first engaging surface 16C of the stand 16 (i.e., the fixing portion 16A) to be inclined so as to slope progressively downwards the further it is in the folding-in direction, and for this first engaging surface 16C to be provided on the drive body 18 (i.e., the engaging cylinder 20A), and for the first engaging projections 20B to be provided on the stand 16 (i.e., the fixing portion 16A). By employing this structure, the drive body 18 (i.e., the engaging cylinder 20A), the gear plate 34 and the clutch plate 36 can be moved upwards and downwards by the stand 16 (i.e., the first engaging surface 16C or the first engaging projections 20B), and the urging force applied by the coil spring 38 to the drive body 18 can be increased or decreased. Consequently, it is unnecessary to provide the second engaging surfaces 20C and the second engaging projections 34A, so that the structures of the drive body 18 and the gear plate 34 can be simplified.

Moreover, in the present exemplary embodiment, the visual recognition device for a vehicle of the present disclosure is the door mirror device 10 for a vehicle. However, the visual recognition device for a vehicle of the present disclosure may also be another mirror device for a vehicle (i.e., another outside mirror device for a vehicle that is located outside the vehicle (for example, a fender mirror device for a vehicle) or an inside mirror device for a vehicle that is located inside the vehicle) or a camera device for a vehicle (i.e., that provides visual recognition assistance to a vehicle occupant via image acquisition) or the like. Priority is claimed on Japanese Patent Application No. 2018-190023, filed Oct. 5, 2018, the disclosure of which is incorporated herein by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. A visual recognition device for vehicle, comprising:
a supporting body that is provided on a vehicle body side;
a rotationally moving body that is supported on the supporting body to as to be able to move rotationally, and whose central axis of rotational movement is tilted relative to an up-down direction, and in which is provided a visual recognition portion that provides visual recognition assistance to a vehicle occupant;
a rotational movement mechanism that rotationally moves the rotationally moving body; and
an urging body that urges the rotationally moving body, and whose urging force that is applied to the rotationally moving body is decreased when the rotational movement mechanism is rotationally moving the rotationally moving body towards an upper side, and whose urging force that is applied to the rotationally moving body is increased when the rotational movement mechanism is rotationally moving the rotationally moving body towards a lower side.

2. The visual recognition device for vehicle according to claim 1, wherein, when the rotational movement mechanism is rotationally moving the rotationally moving body towards the upper side, the rotationally moving body decreases the urging force applied by the urging body to the rotationally moving body, and when the rotational movement mechanism is rotationally moving the rotationally moving body towards the lower side, the rotationally moving body increases the urging force applied by the urging body to the rotationally moving body.

3. The visual recognition device for vehicle according to claim 1, wherein, when the rotational movement mechanism is rotationally moving the rotationally moving body towards the upper side, the supporting body decreases the urging force applied by the urging body to the rotationally moving body, and when the rotational movement mechanism is rotationally moving the rotationally moving body towards the lower side, the supporting body increases the urging force applied by the urging body to the rotationally moving body.

\* \* \* \* \*